US012601433B1

(12) United States Patent
Abbasi

(10) Patent No.: US 12,601,433 B1
(45) Date of Patent: Apr. 14, 2026

(54) SEALABLE DRAIN PIPE COUPLING

(71) Applicant: Abdul Latif Abbasi, Etobicoke (CA)

(72) Inventor: Abdul Latif Abbasi, Etobicoke (CA)

( * ) Notice: Subject to any disclaimer, the term of this patent is extended or adjusted under 35 U.S.C. 154(b) by 0 days.

(21) Appl. No.: 19/087,763

(22) Filed: Mar. 24, 2025

(51) Int. Cl.
*F16L 37/02* (2006.01)
*E04D 13/08* (2006.01)
*F16L 21/08* (2006.01)

(52) U.S. Cl.
CPC ............ *F16L 37/025* (2013.01); *E04D 13/08* (2013.01); *F16L 21/08* (2013.01); *E04D 2013/0846* (2013.01)

(58) Field of Classification Search
CPC ......... F16L 5/02; F16L 55/165; F16L 55/163; F16L 55/1653; F16L 55/1654; F16L 21/08; F16L 21/005; F16L 7/02; F16L 21/035; F16L 37/025; E04D 13/08; E04D 2013/084; E04D 2013/0846
USPC .................................. 285/100, 101, 109, 39
See application file for complete search history.

(56) References Cited

U.S. PATENT DOCUMENTS

| | | | | | |
|---|---|---|---|---|---|
| 2,184,634 | A | * | 12/1939 | Crickmer | ............ E21B 33/1208 138/89 |
| 3,895,652 | A | * | 7/1975 | Zach | ..................... F16L 55/132 138/89 |
| 4,505,499 | A | * | 3/1985 | Uglow | .................... E04D 13/08 285/346 |
| 4,589,447 | A | * | 5/1986 | Kane | ..................... F16L 55/163 29/402.09 |
| 5,695,222 | A | * | 12/1997 | Hodges | .................. E03D 11/16 285/39 |
| 8,534,715 | B2 | * | 9/2013 | Abbasi | .................... F16L 21/08 285/32 |
| 10,184,601 | B2 | * | 1/2019 | Brown | .................... F16L 21/08 |
| 10,788,152 | B2 | * | 9/2020 | Abbasi | .................. E04D 13/08 |
| 11,079,058 | B2 | * | 8/2021 | Furcoiu | ................. F16L 55/163 |
| 12,428,845 | B2 | * | 9/2025 | Petrachek | .............. E04D 13/08 |

* cited by examiner

*Primary Examiner* — David Bochna
(74) *Attorney, Agent, or Firm* — Nasser Ashgriz; UIPatent Inc.

(57) ABSTRACT

A drainpipe coupling is provided to sealably connect an insert pipe with an existing drainpipe. The coupling includes a tubular body positioned concentrically within both the insert and existing drainpipes. A coil spring with an adjustable diameter is positioned around the proximal end of the tubular body, with two actuation ends that move toward and apart from each other, adjusting the spring's diameter. An elastic tubular cover is positioned over both the coil spring and the proximal end of the tubular body, forming a seal at their interface. The coupling features an actuation element within the tubular body, which slides axially to engage the coil spring's actuation ends. The actuation element is connected to a handle that extends through the tubular body and allows axial movement to adjust the diameter. This adjustment deforms the elastic cover, sealing the coupling and ensuring a secure connection between the pipes.

11 Claims, 9 Drawing Sheets

SEALABLE DRAIN PIPE COUPLING

FIELD OF THE INVENTION

The present invention relates to a roof drain insert, specifically to a coupling device that sealably connects a drain insert inside a drain pipe. Sealed coupling devices are used to connect two pipes to each other and make sure that there will be no leaks.

BACKGROUND OF THE INVENTION

A roof drain is designed in a building to remove water from the roof. The replacement and renovation of the roof surface can change the roof height and damage the installed drain pipe/flange during the process, so the drain pipe has to be replaced.

There are several methods and devices for connecting a drain pipe. One simple and low-cost method is to tightly insert a smaller pipe into the drain pipe and seal the connection of two pipes with an adhesive or caulking compound. However, these types of seals are generally not reliable, and there is a potential for the development of cracks and, consequently, water leakage. Additionally since the drain pipes are usually 12 to 24 inches below the roof surface, access for adhesive and caulking is sometimes almost impossible.

Existing devices that form sealed joints between concentric components can present challenges. These devices may restrict water flow by reducing the cross-sectional area, leading to inefficiencies in water drainage. Additionally, the installation of such devices often requires specialized tools and can be time-consuming, adding complexity to the process. These limitations highlight the need for a more efficient and reliable solution that ensures a secure, leak-proof connection without impeding water flow or requiring extensive installation efforts.

Accordingly, one objective of the present invention is to overcome these limitations by providing a novel coupling device that allows a drain insert to be securely and sealably affixed inside a drain pipe while minimizing flow restriction. The present invention enhances drainage efficiency, simplifies installation, and eliminates the need for specialized tools or any tools, thereby improving both performance and ease of use. The present invention further provides a coupling device that accommodates different pipe sizes, mitigates potential failures due to thermal expansion, and ensures a long-lasting and resilient seal that maintains system integrity over time.

SUMMARY OF THE INVENTION

The present invention relates to a drain pipe coupling designed to securely and sealably connect an insert pipe with an existing drain pipe. The drain pipe coupling comprises a tubular body, a coil spring, an elastic tubular cover, an actuation element, and a handle. The tubular body includes a circumferential groove formed on its outer surface along its proximal portion. The groove comprises a recessed cavity extending through the wall of the tubular body to form an opening. The tubular body is concentrically positioned within both the insert and existing drain pipes. The coil spring with an adjustable diameter is positioned around the proximal end of the tubular body within the groove. The coil spring has two actuation ends extending inward through the recessed cavity into the interior of the tubular body. Movement of the actuation ends toward and apart from each other decreases and increases the diameter of the coil spring, respectively.

The pipe coupling in the present invention comprises a tubular body having a coil spring positioned on its proximal end and an elastic tubular cover concentrically positioned over both the coil spring and the proximal portion of the tubular body. The pipe coupling further comprises an actuation element connected to a handle positioned into the interior of the tubular body with the actuation element positioned adjacent to the proximal end of the tubular body and the handle extending from the distal end of the tubular body. The pipe coupling is inserted in between the drain pipe and the insert pipe, and the actuation element is in contact with the actuation end of the coil spring. By pushing the handle along the axis of the tubular body, the actuation element moves toward the proximal end of the tubular body, and the actuation end of the coil spring moves apart from each other, increasing the diameter of the coil spring. As the diameter of the coil spring increases, the coil spring pushes the elastic tubular cover. The coil spring causes the elastic tubular cover to deform and expand to sealably come into contact with the inner surfaces of the drain and insert pipe.

The elastic tubular cover is concentrically positioned over both the coil spring and the proximal portion of the tubular body. The elastic tubular cover has an internal diameter appropriately sized and contoured to grip the proximal portion of the tubular body. It forms a seal at the interface between the elastic tubular cover and the tubular body.

The actuation element is positioned within interior of the tubular body adjacent to the proximal end. The actuation element is a plate that is contoured to match interior circumference of the tubular body, enabling it to slide along the tubular body's interior surface. The actuation element has an isosceles trapezoid-shaped aperture on its surface. The actuation ends of the coil spring are hooked into this aperture, allowing them to slide along isosceles sides of the aperture. The actuation element is configured to slide axially within the tubular body and engage the actuation ends of the coil spring. Axial movement of the actuation element adjusts the spacing between the actuation ends and alters the diameter of the coil spring.

A handle is connected to the actuation element. The handle extends through the length of the tubular body and is accessible from a distal end of the tubular body. A plurality of guide elements are affixed to the interior surface of the tubular body. Each guide element defines an aperture through it, and the handle passes through these apertures. The apertures aligned and supported the handle for axile movement along the tubular body's length.

Axial movement of the handle causes the axial movement of the actuation element within the tubular body, and axial movement of the actuation element causes the actuation ends of the coil spring to change the space between them and adjust the diameter of the coil spring. A decrease in the diameter of the coil spring reduces the diameter of the elastic sealing element. It enables the drain pipe coupling to be inserted between the existing drain pipe and the insert pipe. An increase in the diameter of the coil spring expands and deforms the elastic tubular cover and allows the proximal end of the drain pipe coupling to grip and seal the insert pipe and the existing drain pipe.

The coil spring is made of a metallic material selected from stainless steel, titanium, or an alloy with high elasticity. The elastic tubular cover is made of a natural rubber, a synthetic rubber, a fluid impermeable, or a compressible elastomeric material.

BRIEF DESCRIPTION OF THE DRAWINGS

Embodiments herein will hereinafter be described in conjunction with the appended drawings provided to illustrate and not to limit the scope of the claims, wherein like designations denote like elements, and in which:

DETAILED DESCRIPTION OF THE DRAWINGS

Figure 1A:
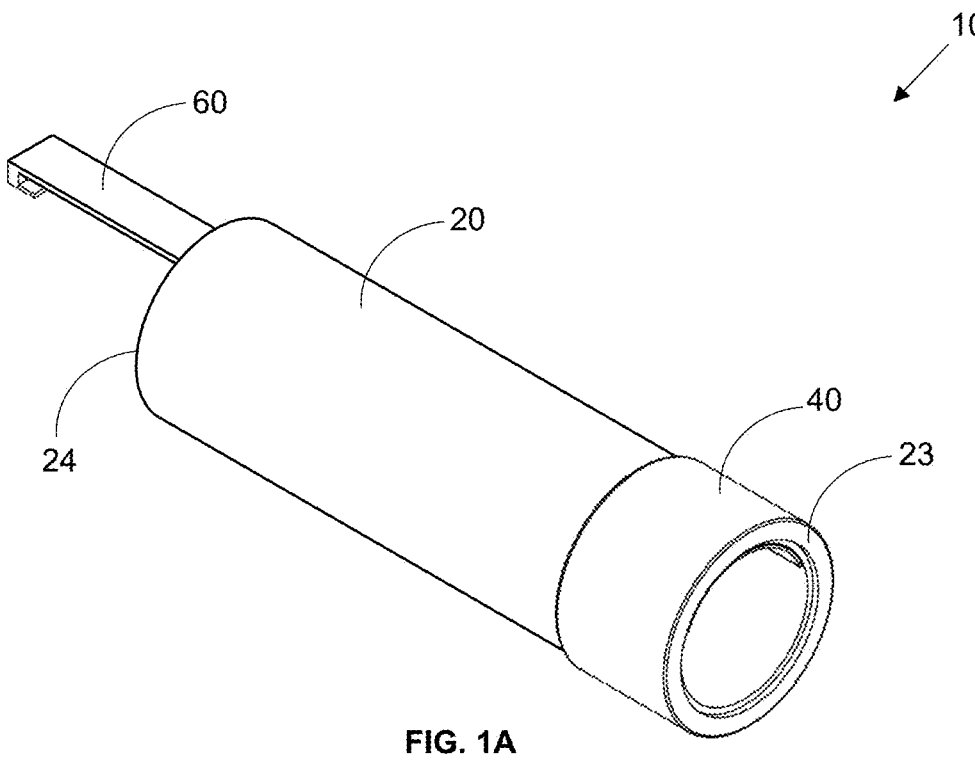
FIG. 1A shows an isometric view of one embodiment of the invention.
Figure 1B:
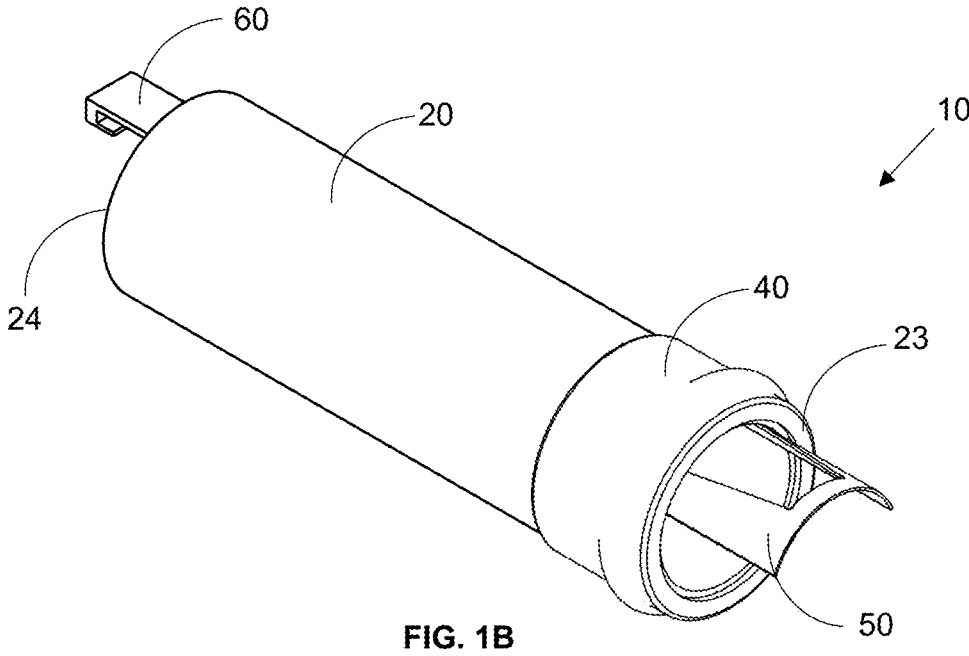
FIG. 1B shows another isometric view of the embodiment of the invention.

FIGS. 1A, 1B, 2, 6A, 6B, 7A and 7B show one embodiment of the present invention. The present invention is a drain pipe coupling 10 designed to form a sealed joint between two concentric pipes. In particular, the drain pipe coupling 10 is used to connect a new pipe 70 to an existing drain pipe 80 of the type generally found on rooftops. The drain pipe coupling 10 comprises a solid tubular/cylindrical body 20, a coil spring 30, an elastic tubular cover 40 of rubber or similar material, and an actuation element 50 connected to a handle 60.

Figure 2:
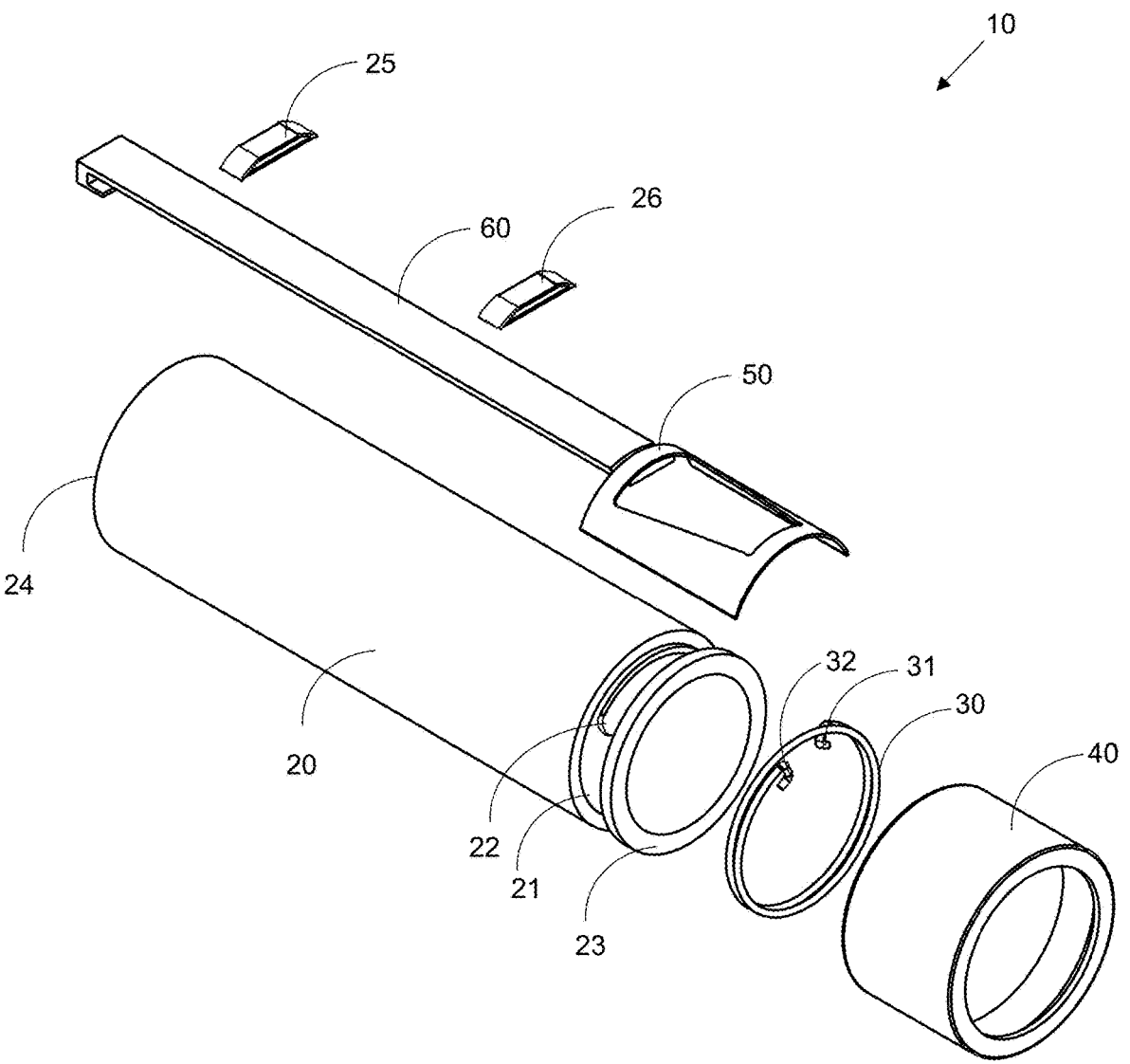
FIG. 2 shows an exploded view of the embodiment of the invention.

FIG. 2 shows the exploded view of the drain pipe coupling 10. The tubular body 20 has a proximal end 23 and a distal end 24. A circumferential groove 21 is formed on the outer surface of the tubular body 20 along its proximal end 23. The circumferential groove 21 includes a recessed cavity 22 along a portion of its circumference, the recessed cavity 22 extending through the wall of the tubular body 20 to form an opening.

Figure 3:
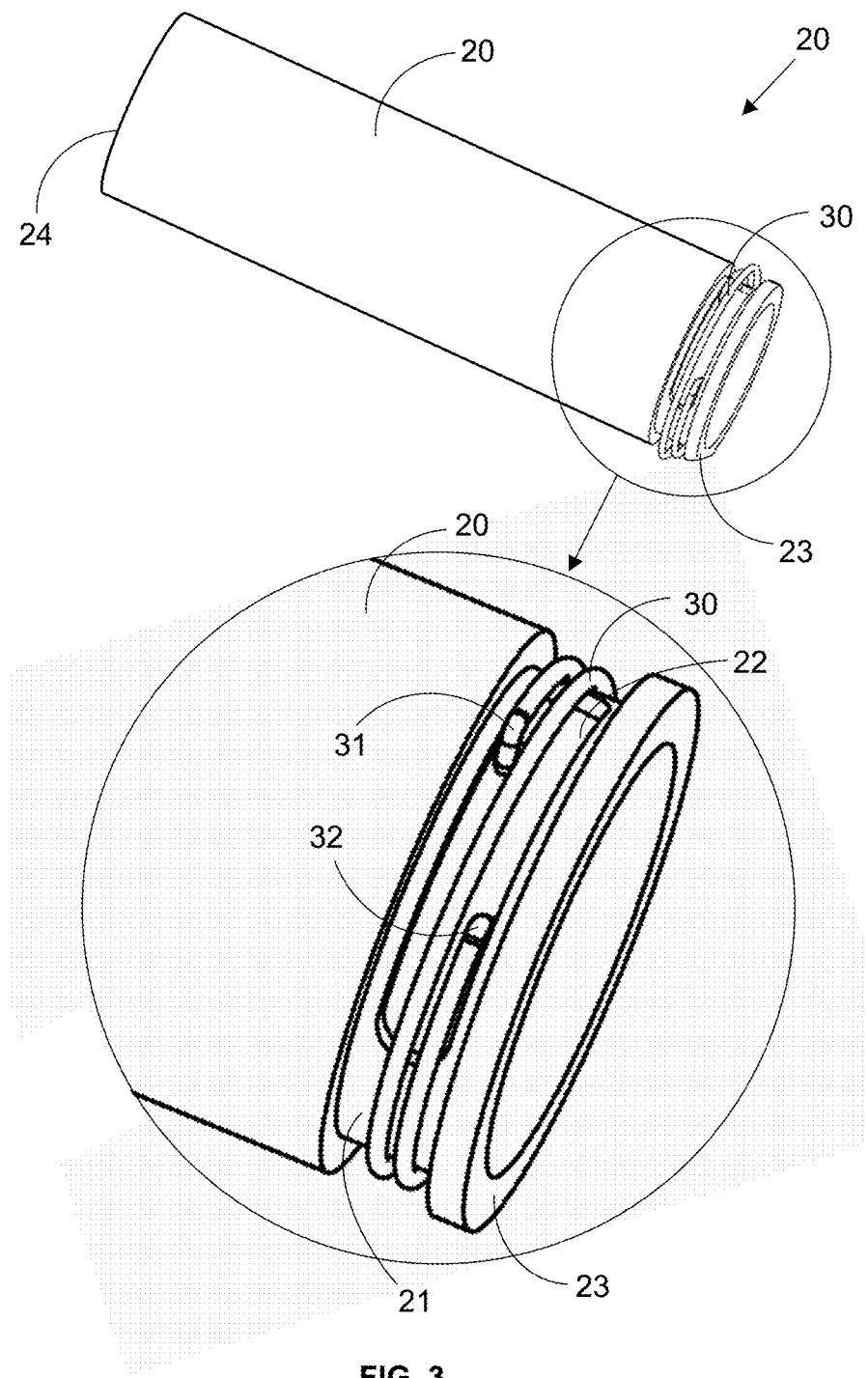
FIG. 3 shows an isometric view of a tubular body of the invention.
Figure 4:
FIG. 4 shows an isometric view of an actuation element of the invention.
Figure 4:
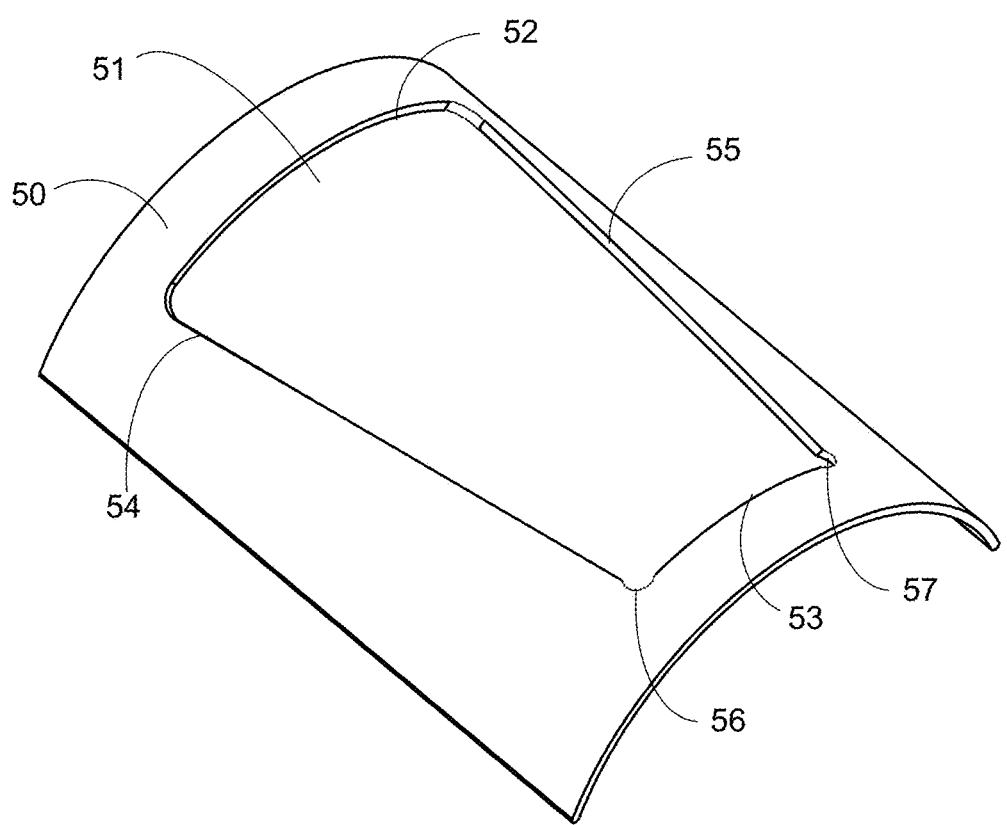

As shown in FIG. 3, the coil spring 30 is positioned within the circumferential groove 21 formed around the proximal end 23 of the tubular body 20. The circumferential groove 21 provides a seating area for the coil spring 30. The coil spring 30 includes two actuation ends 31 and 32 extending inward toward the tubular body's central axis 20. These actuation ends 31 and 32 pass through the recessed cavity into the interior of the tubular body 20. The coil spring 30 has an adjustable diameter, wherein upon movement of the actuation ends 31 and 32 toward and apart from each other, the diameter of the coil spring 30 decreases and increases, respectively FIG. 4 shows one embodiment of the actuation element 50. The actuation element 50 is contoured to match the curvature of the tubular body's 20 interior surface, enabling it to slide along the interior surface during operation. The actuation element 50 features an isosceles trapezoid-shaped aperture 51 on its surface. The parallel sides of this trapezoidal aperture 51 are referred to as the larger base 52 and the smaller base 53, while the non-parallel sides are the isosceles sides 54 and 55. At the two angles where the isosceles sides 54 and 55 meet the smaller base 53, the actuation element 50 features two grooves 56 and 57. These grooves 56 and 57 are configured to receive the actuation ends 31 and 32 of the coil spring 30 as shown in FIG. 5B.

Figure 5A:
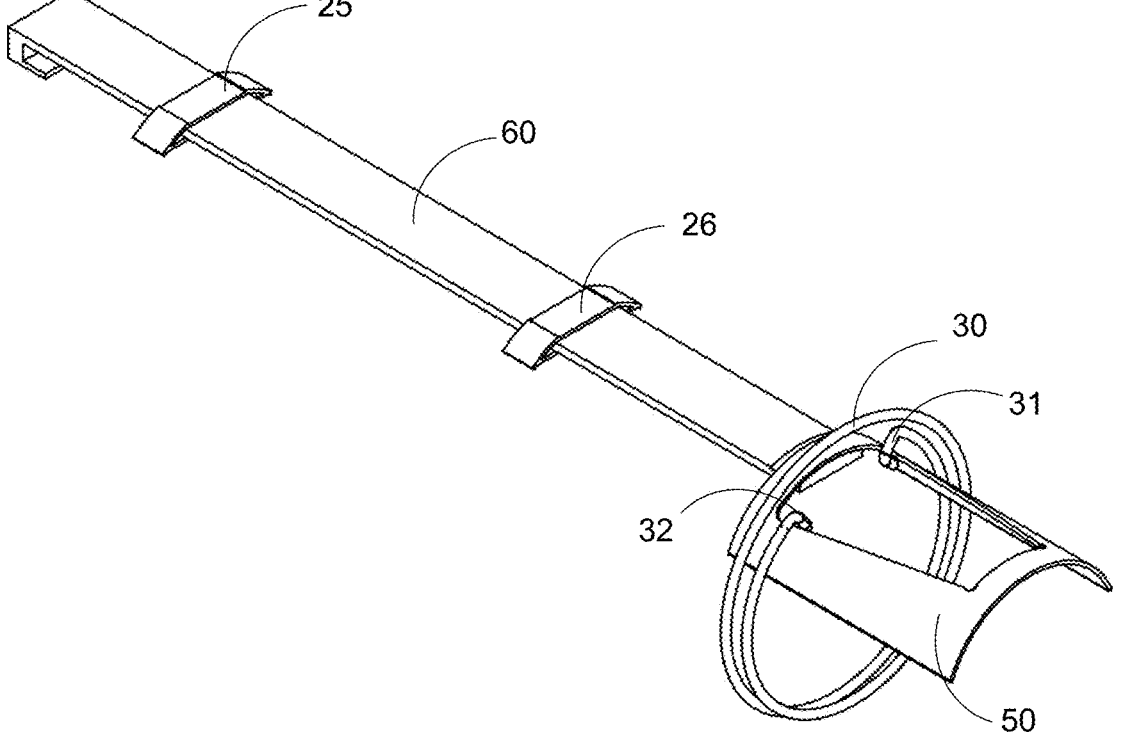
FIG. 5A shows an isometric view of the actuation element connected to the handle in a compressed state of the invention.
Figure 5B:
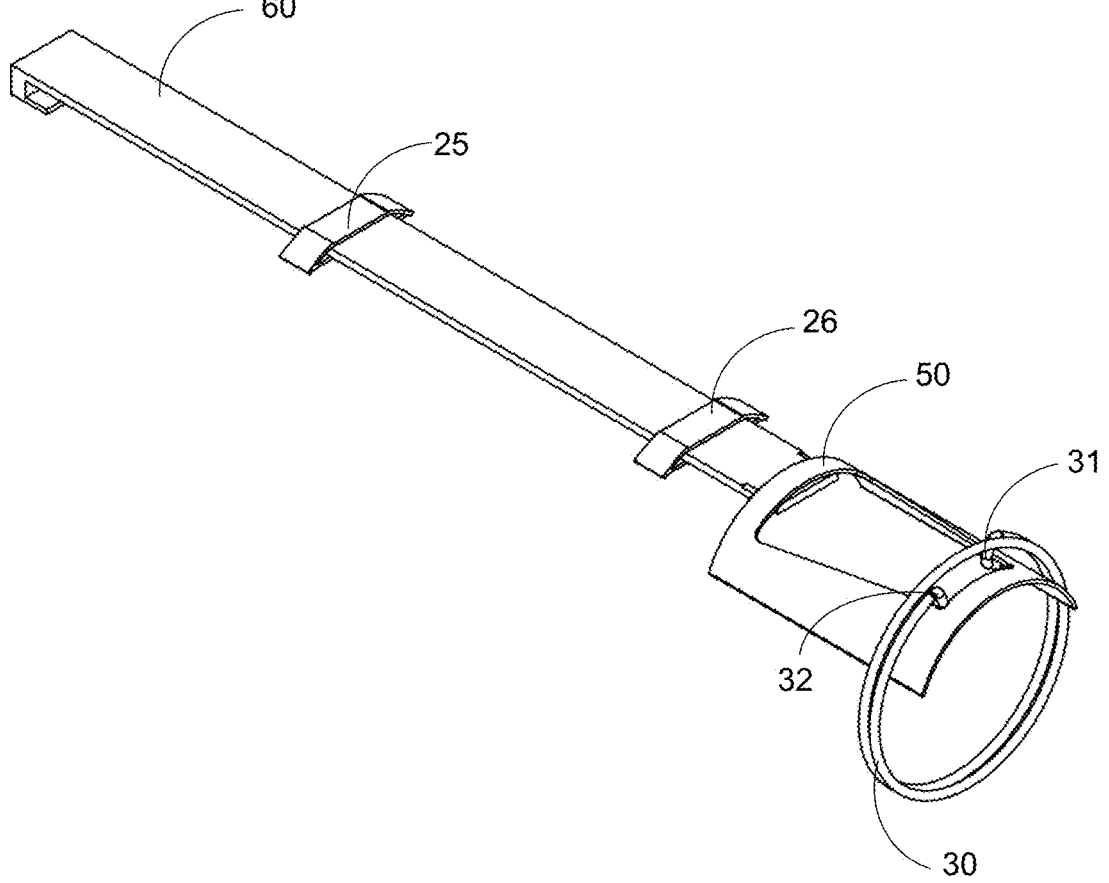
FIG. 5B shows an isometric view of the actuation element connected to the handle in an expanded state of the invention.

FIGS. 5A and 5B show one embodiment of the actuation element 50 connecting to the handle 60. The handle 60 is connected to the larger base 52 of the actuation element 50, and it extends through the length of the tubular body 20, making it accessible from the distal end 24. The handle 60 is guided by a plurality of guide elements 25 and 26 affixed to the interior surface of the tubular body 20. Each of the plurality of guide elements 25 and 26 defines an aperture through which the handle 60 passes, thereby aligning and supporting the handle 60 for axile movement along the tubular body's 20 length (shown in FIGS. 6A and 6B). Two actuation ends 31 and 32 of the coil spring 30 are hooked onto the isosceles sides 54 and 55 of the trapezoidal aperture 51 and can slide along the isosceles sides 54 and 55. As shown in FIG. 5A, in the compressed state, the actuation ends 31 and 32 of the coil spring 30 are positioned adjacent to the smaller base 53 of the trapezoidal aperture 51, and the actuation ends 31 and 32 have the least distance from each other and the coil spring 30 is in its smallest diameter. As shown in FIG. 5B, in the expanded state, the actuation ends 31 and 32 of the coil spring 30 are positioned adjacent to the larger base 52 of the trapezoidal aperture 51, and the actuation ends 31 and 32 have the most distance from each other and the coil spring 30 is in its largest diameter.

The actuation element 50 can be designed in any other shape to engage the actuation ends of the coil spring and adjust the diameter of the coil spring.

As shown in FIGS. 1A, 1B, 6A, 6B, 7A, and 7B, the elastic tubular cover 40 is concentrically positioned over both the coil spring 30 and the proximal portion of the tubular body 20, enclosing them within its structure. The elastic tubular cover 40 is configured to elastically grip the proximal portion of the tubular body 20, exerting a compressive force to securely retain the coil spring 30 within its circumferential groove 21. The elastic tubular cover 40 forms a seal at the interface between itself and the tubular body 20, preventing leakage or unintended displacement.

Figure 6A:
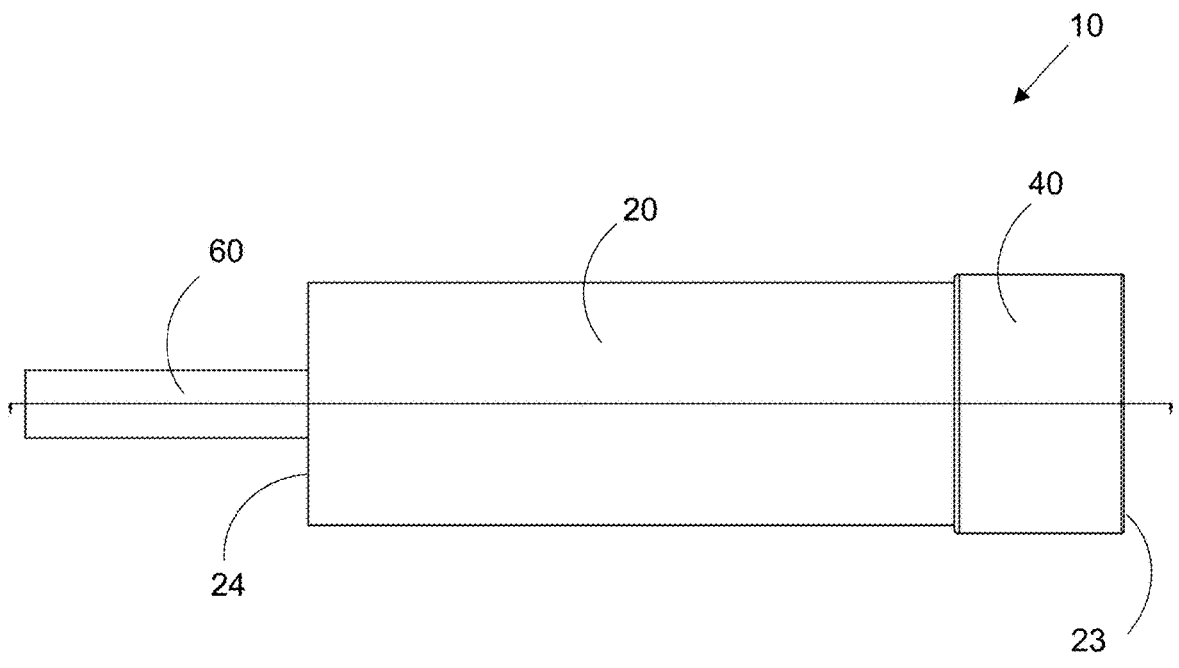
FIG. 6A shows a cross-sectional view of the embodiment of the invention in compressed.
Figure 6A:
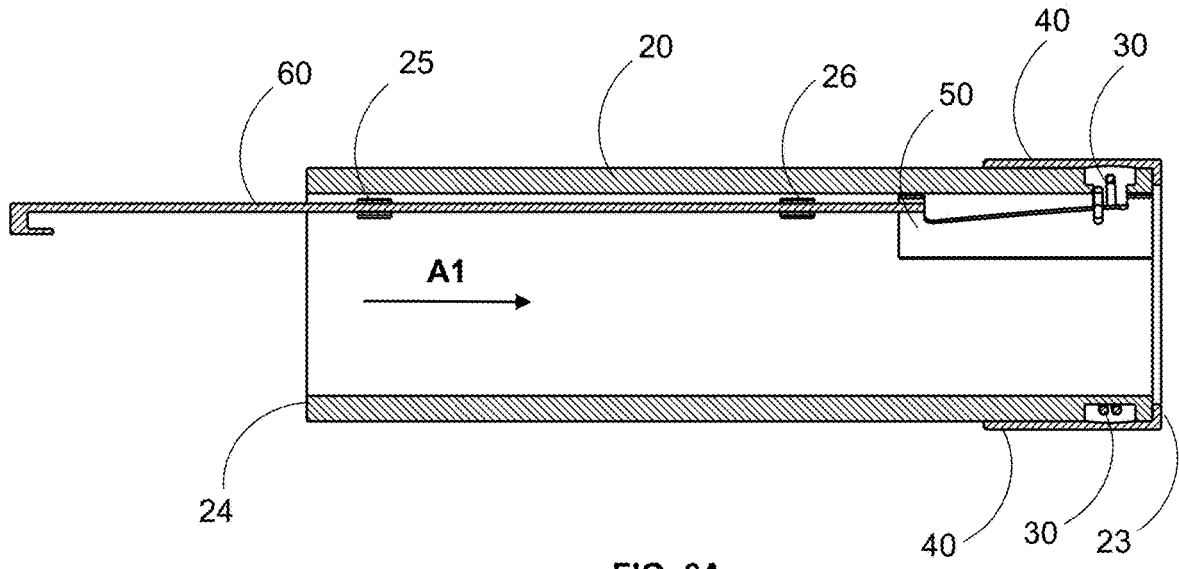
Figure 6B:
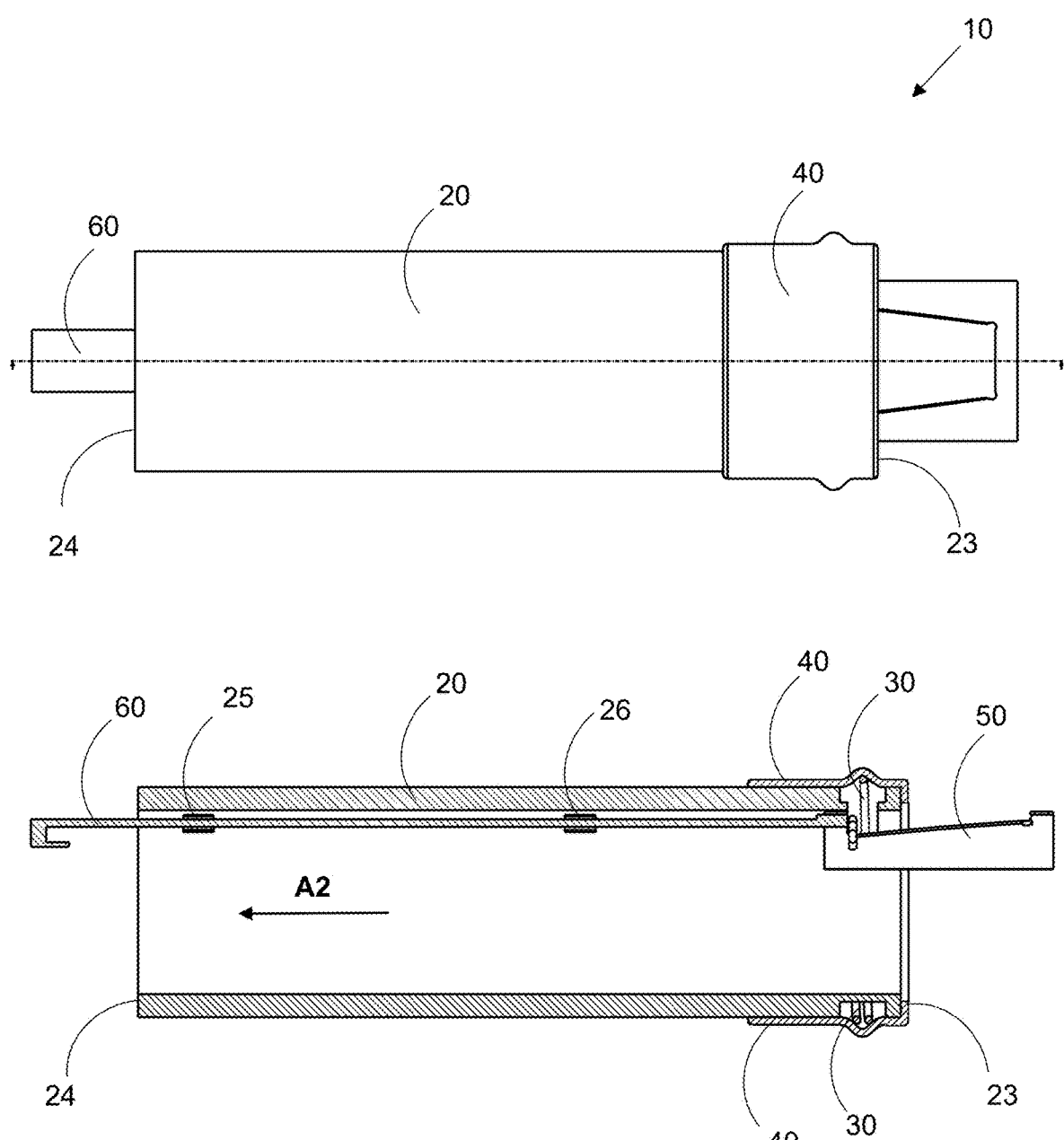
FIG. 6B shows a cross-sectional view of the embodiment of the invention in expanded state.

FIGS. 6A and 6B show cross-sectional views of the drain pipe coupling 10 in compressed and expanded states, respectively. The actuation element 50 is configured to be positioned within the interior of the tubular body 20, adjacent to its proximal end 23. The handle 60 is guided by a plurality of guide elements 25 and 26 affixed to the interior surface of the tubular body 20. In the compressed state, the actuation ends 31 and 32 of the coil spring 30 are positioned adjacent to the smaller base 53 of the trapezoidal aperture 51, and the actuation ends 31 and 32 have the least distance from each other and the coil spring 30 is in its smallest diameter. The elastic tubular cover 40 is not under any force from the coil spring 30 and is in its initial shape. By pushing the handle 60, aligning with the longitudinal axis of the tubular body 20 (in the A1 direction), the actuation element 50 moves toward the proximal end 23 of the tubular body 20, extending outward from the tubular body 20.

This movement results in the actuation ends 31 and 32 sliding along the isosceles sides 54 and 55 toward the larger base 52 of the trapezoidal aperture 51, thereby increasing the distance between the actuation ends 31 and 32. By increasing the distance between the actuation ends 31 and 32, the diameter of the coil spring 30 increases, causing the elastic tubular cover 40 to deform and expand. In the expanded state, the elastic tubular cover 40 grips the existing pipe and the new pipe, creating a seal between the two pipes. By pulling the handle 60, aligning with the longitudinal axis of the tubular body 20 (in the A2 direction), the actuation element 50 moves toward the distal end 24 of the tubular body 20. This movement results in the actuation ends 31 and 32 sliding along the isosceles sides 54 and 55 toward the smaller base 53 of the trapezoidal aperture 51, thereby reducing the distance between the actuation ends 31 and 32. By reducing the distance between the actuation ends 31 and 32, the diameter of the coil spring 30 decreases, causing the elastic tubular cover 40 to compress to its initial shape.

Figure 7A:
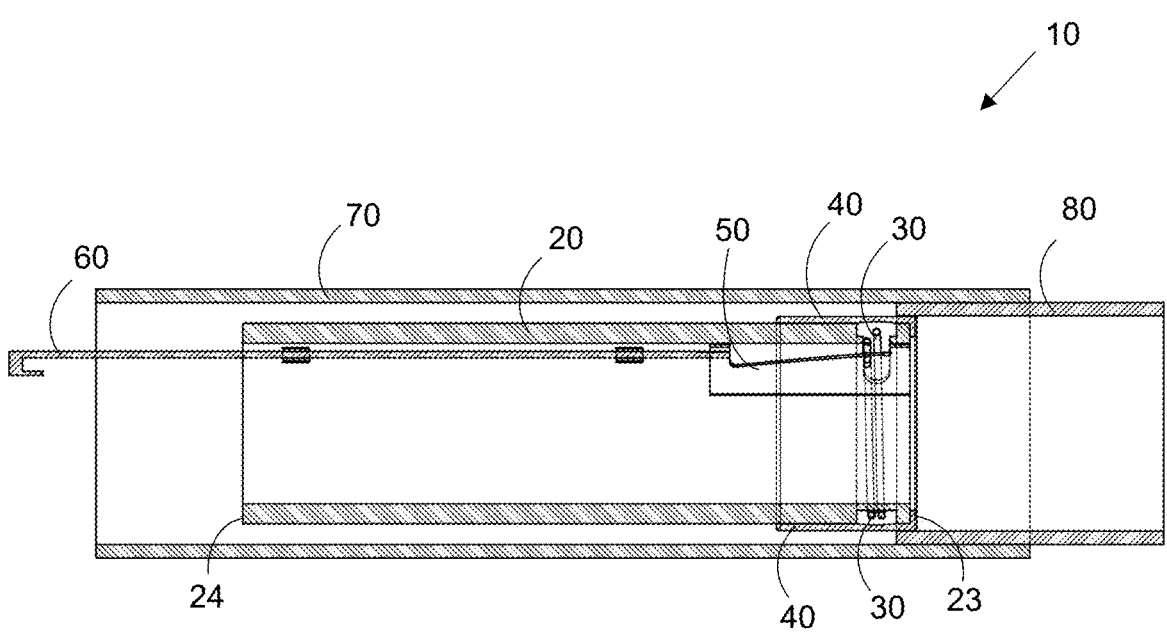
FIG. 7A shows a cross-sectional view of the embodiment of the invention in the compressed state after it is installed.
Figure 7B:
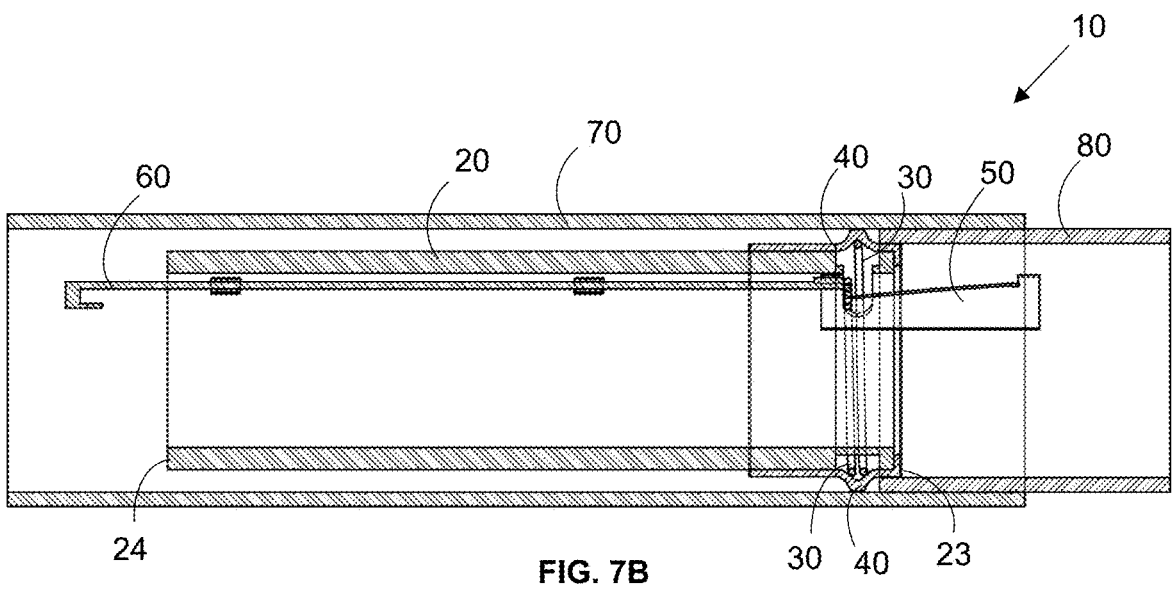
FIG. 7B shows a cross-sectional view of the embodiment of the invention in the expanded state after it is installed.

FIGS. 7A and 7B show cross-sectional views of the embodiment of the invention in the compressed and expanded states after it is installed, respectively. In the compressed state, the drain pipe coupling 10 is inserted within a new pipe 70 connected to an existing drain pipe 80, with proximal end 23 of the drain pipe coupling 10 passing the connection point between the new pipe 70 and the existing drain pipe 80. The diameter of the tubular body 20 and the elastic tubular cover 40 is smaller than those in the new pipe 70 and the existing drain pipe 80; thereby, the drain pipe coupling 10 can be inserted within the pipes 70 and 80. By pushing the handle 60 from the distal end 24 of the tubular body 20, the actuation element 50 moves toward the proximal end 23 of the tubular body 20 and the actuation ends 31 and 32 of the coil spring 30 moves apart from each other, thereby the coil spring 30 expands and cuses the elastic tubular cover 40 to deforme and expand. In the expanded state, the proximal end of the tubular body 20 and elastic tubular cover 40 grip the internal wall of the existing drain pipe 80, and the deformed part of the elastic tubular cover 40 grip the internal wall of the new pipe 70, thereby sealing the connection between the pipes 70 and 80.

Again, as shown in FIGS. 7A and 7B, the present invention takes little space inside the existing drain pipe 80 and the new pipe 70, and the flow of water has no restriction by use of the present invention. The drain pipe coupling 10 doesn't require external instruments for installation.

The coil spring 30 can be made of a metallic material from stainless steel, titanium, or an alloy with high elasticity. The coil spring 30 also can be coated with a protective layer to prevent corrosion. The coil spring 30 is configured to exert a preloaded force against the elastic sealing element for continuous sealing pressure.

The tubular body 20 can be constructed from a rigid material such as stainless steel, reinforced plastic, or carbon fiber composite to provide structural integrity. The tubular body 20 and the elastic tubular cover 40 can be composed of materials resistant to corrosion and chemical degradation.

The elastic tubular cover 40 can be made of rubber or similar material (natural or synthetic, a fluid impermeable, compressible elastomeric material preferably of neoprene elastomers or rubber), which is appropriately sized and contoured to internally grip and seal the joining pipes.

The handle 60 may include an ergonomic grip at the distal end to facilitate manual operation.

The invention claimed is:

1. A drain pipe coupling to sealably couple an insert pipe with an existing drain pipe, said drain pipe coupling comprising:
   a. a tubular body concentrically positioned in said insert pipe and said existing drain pipe;

b. a coil spring with an adjustable diameter, positioned around a proximal end of the tubular body, with two actuation ends extending inward, wherein movement of the two actuation ends toward and apart from each other decreases and increases diameter of the coil spring, respectively;
   c. an elastic tubular cover concentrically positioned over both the coil spring and the proximal end of the tubular body and having an internal diameter appropriately sized and contoured to grip the proximal end of the tubular body and forms a seal at interface between the elastic tubular cover and the tubular body, and
   d. an actuation element positioned within an interior of the tubular body adjacent to the proximal end, configured to slide axially within the tubular body and engage the actuation ends of the coil spring, wherein the actuation element is connected to a handle extending through a length of the tubular body, wherein the handle is accessible from a distal end of the tubular body and an axial movement of the handle causes the axial movement of the actuation element within the tubular body and causes a change in the spacing between the actuation ends of the coil spring, thereby adjusting the diameter of the coil spring and whereby an increase in the diameter of the coil spring expands and deforms the elastic tubular cover, allowing the proximal end of the drain pipe coupling to grip and seal the insert pipe and the existing drain pipe.

2. The drain pipe coupling of claim 1, wherein the drain pipe coupling further comprises a plurality of guide elements affixed to an interior surface of the tubular body, each defining an aperture through which the handle passes, thereby aligning and supporting the handle for axial movement along a length of the tubular body.

3. The drain pipe coupling of claim 1, wherein the actuation element comprises a plate contoured to match an interior circumference of the tubular body, enabling it to slide along an interior surface of the tubular body, and an isosceles trapezoid-shaped aperture on its surface, wherein the actuation ends of the coil spring are hooked into the aperture, allowing the actuation ends to slide along isosceles sides, whereby axial movement of the actuation element adjusts the spacing between the actuation ends, thereby altering the diameter of the coil spring.

4. The drain pipe coupling of claim 1, wherein the tubular body comprises a circumferential groove formed on its outer surface along the proximal portion, the groove comprising a recessed cavity extending through the wall of the tubular body forming an opening, wherein the coil spring is positioned within the groove such that the actuation ends of the coil spring extend inward through the recessed cavity into the interior of the tubular body.

5. The drain pipe coupling of claim 1, wherein the coil spring is made of a metallic material selected from the groups of stainless steel, titanium, or an alloy with high elasticity.

6. The drain pipe coupling of claim 1, wherein the elastic tubular cover is made of a natural rubber, a synthetic rubber, a fluid impermeable, or a compressible elastomeric material.

7. The drain pipe coupling of claim 1, wherein the handle includes an ergonomic grip at the distal end to facilitate manual operation.

8. The drain pipe coupling of claim 1, wherein the tubular body and the elastic tubular cover are composed of materials resistant to corrosion and chemical degradation.

9. The drain pipe coupling of claim 1, wherein the coil spring is coated with a protective layer to prevent corrosion.

10. The drain pipe coupling of claim 1, wherein the coil spring is configured to exert a preloaded force against the elastic sealing element for continuous sealing pressure.

11. The drain pipe coupling of claim 1, wherein the tubular body is constructed from a rigid material such as stainless steel, reinforced plastic, or carbon fiber composite to provide structural integrity.

* * * * *